P. L. HATFIELD.
GEAR DRIVE FOR SEEDING MACHINES.
APPLICATION FILED JULY 26, 1916.

Patented Dec. 3, 1918.
2 SHEETS—SHEET 1.

INVENTOR.
Paul L. Hatfield
By
ATTY.

P. L. HATFIELD.
GEAR DRIVE FOR SEEDING MACHINES.
APPLICATION FILED JULY 26, 1916.
1,286,616.
Patented Dec. 3, 1918.
2 SHEETS—SHEET 2.
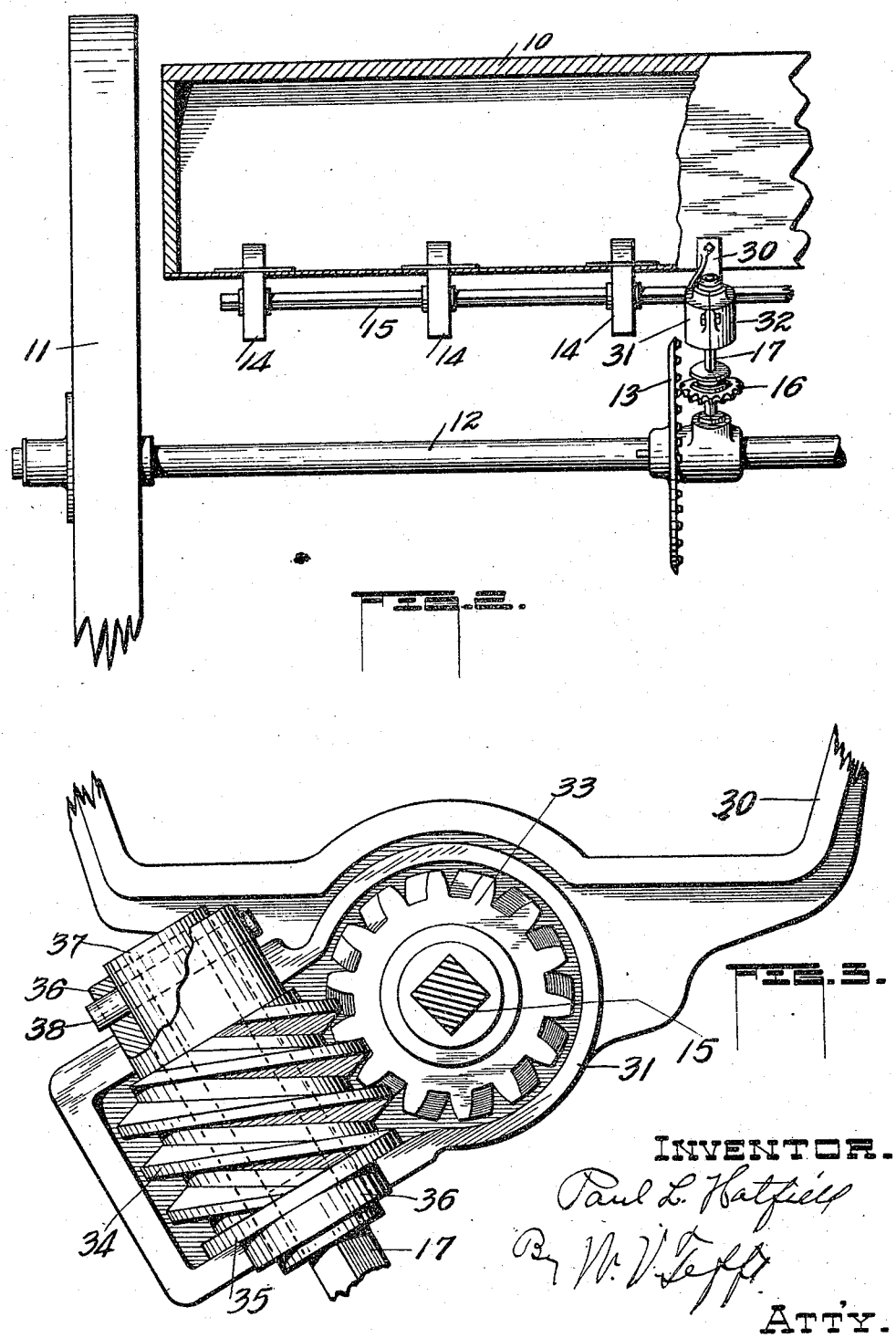
INVENTOR.
Paul L. Hatfield
By W. V. Tefft
ATT'Y.

UNITED STATES PATENT OFFICE.

PAUL L. HATFIELD, OF PEORIA, ILLINOIS.

GEAR-DRIVE FOR SEEDING-MACHINES.

1,286,616.  Specification of Letters Patent.  Patented Dec. 3, 1918.

Application filed July 26, 1916. Serial No. 111,370.

*To all whom it may concern:*

Be it known that I, PAUL L. HATFIELD, a citizen of the United States, residing at Peoria, in the county of Peoria and State of Illinois, have invented certain new and useful Improvements in Gear-Drive for Seeding-Machines, of which the following is a specification.

My invention relates to seeding machines. More particularly, my invention relates to gear members associated with the driving connection from the machine axle to the feed shaft and a breakable pin associated with said gear.

The objects of my invention are:

1. To keep the centers respectively of the driving axle and feed shaft as close together as possible and at the same time be able to use a variable speed gear of large diameter to the end of facilitating a large number of speed changes.

2. To build this gear arrangement so that it it is possible and practical to substitute parts having different thread leads on worm members and different tooth angles on worm wheels, and still retain the same diametrical sizes and therefore the same center distances between the driving and driven member of each gear set so that sets of gears with varying ratios can be used in the one common limited spaced position and housing.

3. To provide a means for protecting various parts of the grain feeding devices and of the driving gearing against breakage should any foreign matter become lodged in the feeding devices.

4. Other objects.

My invention consists in the formation and relative arrangement of the gear members above noted including a breakable pin, the housing, etc., and to detailed combinations hereinafter more particularly referred to.

Referring to the drawings:

Fig. 2 is a partial rear view with a part of the feed box broken away.

Fig. 3 is a side view of the worm gear and one section of the case therefor, with a portion of worm gear broken away to show the manner of positioning the breakable pin with relation to the gear members and a sleeve.

Figure 1:
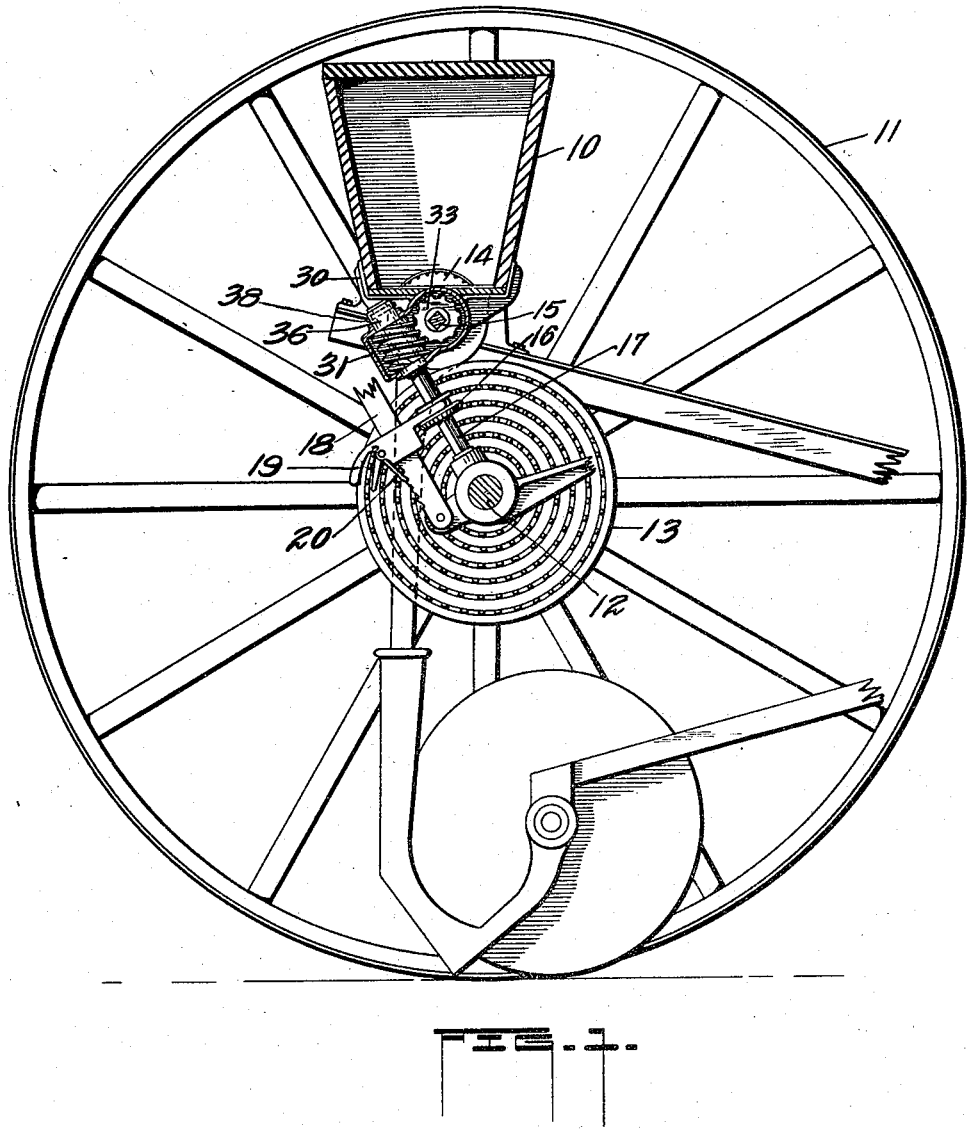
Figure 1 is a vertical cross section through the body of a seeding machine on lines that cut through the casing for the special gear members.

A close association with the seeding machine business for quite a number of years has brought to my knowledge the fact that, with the improvement in farming methods and the broadening of the marketing field of manufacturers of this type of seeder, the necessity of providing this type of machine with the broadest possible variation as to quantity of feed has developed.

This capability of machines has measurably been accomplished by enlarging certain gear members, but the effect of such enlargement has caused either a raising of the feed box or multiple of mutilations of the same to provide clearance for such gears. I avoid all disadvantages resulting from such modifications and increase by applying my special gear the quantity feed limits beyond the possibility of increase resulting from a reasonable application of the above noted modifications over heretofore standard structures.

The variation in the quantity of feed that has heretofore been accomplished by varying the diameters of gear wheels cannot now be practically applied in view of the present demand for a wider range of variation. I am able to cover this new demand measurably by the use of the worm and worm gear, but am able completely to meet this demand by applying substitute sets of gears that have the varying leads on the worm and varying angle of the worm wheel teeth, which sets because of their conforming diameters are capable of use in the same gear housing without change and without changing the distance between said gear centers or driving axle and feed shaft centers. With other forms of gears this substitution could not be made on account of the necessary changes in diameter of one or both gears of each set without changing the distance between said gear centers.

I am not aware of a limiting tension device, as a breakable pin, being applied to a seeding machine and while I am aware that limiting tension devices are common matters of association with machinery and hence are not broadly new; yet there is the special application herein shown that reaches extremely beneficial results in connection with seeder devices that I consider worthy of patent.

Referring to the drawings:

10 is a seed box; 11 are wheels; 12 is an axle; 13 is a disk provided with plural sets of spurs or gear members, all of said parts being old and common in the practical art. Similarly, plural force feed members as 14 and a squared common driven shaft 15 are old. It is common to employ a shiftable gear as 16 on a driven shaft as 17 and working in conjunction with a multiple gear disk 13. Also it is common to provide means for adjusting a gear as 16 by members similar to ratchet arm 18, shiftable fork member 19, and ratchet pawl 20.

Referring particularly to devices embraced within my invention:

30 is a bracket member designed to be attached to a frame member, or frame members of the seeding machine as, for instance, attached to the seed box in the manner shown in Figs. 1 and 2; 31 is a casing member forming a part of bracket 30 and 32 is similarly a casing member coöperating with member 31 to form a gear box or casing for the housing of special gear members, said casing member 32 being detachably related to casing member 31.

33 is a worm wheel carried on squared shaft 15 and is held against longitudinal movement thereon by the gear box; 34 is a worm gear provided with flange member 35 and with hub members 36. This worm gear 34 is housed in casing members 31 and 32, the hub portions thereof being journaled in the casing walls of said members as best shown in Fig. 3; 37 is a sleeve housed within the worm gear and its hub extension and under certain conditions is turnable therein, said sleeve having a squared interior opening conformatory to squared shaft member 17, which said squared shaft member serves to drive said sleeve continuously, and 38 is a pin preferably of wood that is carried through relatively matching perforations in hub extension 36 and sleeve 37 as best shown in Fig. 3.

The parts of the gearing device being arranged in the manner best shown in Fig. 3, movement of worm wheel 34 serves to drive worm wheel 33 which in turn drives shaft 15 which said shaft being common to all of the feeding devices 14 the latter will be driven for seeding purposes with speeds varying in proportion to the variable speed of shaft 15, supplemented by changes of worm and worm wheel sets.

While the machine is in operation, should any abnormal obstructing material enter the feeding devices in the hopper, the driving connection between shaft 17 and worm 34 will be interrupted by the breaking of pin 38, thus safeguarding against breakage of machine parts.

The worm and worm wheel as a type of gear offers the advantage of association within very narrow limits as to space. It offers also the advantage of great strength.

I have shown one form of embodiment of my device and one means of applying it. However, it may be differently formed and applied, of course, within reasonable limits without departing from the principle involved. I therefore, aim to claim all forms and means of applying my device that fall legitimately within the principle disclosed.

What I claim is:

1. In a seeding machine, the combination of a shaft carrying seeding devices, a drive shaft therefor, a worm wheel removably mounted on said seeding shaft, a sleeve removably mounted upon, and rotatable with said driving shaft, a worm engaging said worm wheel fitting over said sleeve and rotatable thereon, and an engaging member connecting said worm to the sleeve in relation to permit disengagement of the worm and sleeve under abnormal strain.

2. In a seeding machine, the combination of a shaft carrying seeding devices, a drive shaft therefor, a worm wheel removably mounted on said seeding shaft, a sleeve removably mounted upon, and rotatable with, said driving shaft, a worm engaging said worm wheel fitting over said sleeve and rotatable thereon, an engaging member connecting said worm to the sleeve in relation to permit disengagement of the worm and sleeve under abnormal strain, and a separable housing for said worm and worm wheel related thereto and to the drive and seeding shafts for properly spacing the latter member.

3. In a seeding machine, the combination of a shaft carrying seeding devices, a drive shaft therefor, a worm wheel having projecting hubs removably mounted on said shaft, a sleeve fitted upon and rotatable with the drive shaft, a worm engaging said worm wheel removably mounted upon said sleeve and rotatable thereon provided with hub members, a separable housing for said worm and worm wheel provided with bearings for the hubs of said members, an engaging means between said worm and sleeve to cause them under normal strains to be turned with the movement of the drive shaft, but under abnormal strains to be disengaged.

4. In a seeding machine, the combination of a shaft carrying the seeding devices, a polygonal driving shaft therefor, a worm wheel removably mounted on said seeding shaft, a sleeve mounted upon and rotatable with said driving shaft, a worm engaging said worm wheel fitting over said sleeve and rotatable thereon, and a breakable pin extending through said worm, sleeve and shaft to connect said worm with the shaft and sleeve.

5. In a seeding machine, the combination of a shaft carrying the seeding devices, a square driving shaft therefor, a worm wheel having projecting hubs removably mounted on said seeding shaft, a sleeve having a square socket fitted upon and rotatable with the driving shaft, a worm engaging said worm wheel mounted upon said sleeve and rotatable thereon, hubs on said worm, a separable housing for said worm and worm wheel provided with bearings for the hubs of said members, and a breakable pin connecting said worm to the sleeve and driving shaft.

6. In a seeding machine, the combination of a shaft carrying the seeding device, a square driving shaft therefor, a worm wheel having projecting hubs removably mounted on said seeding shaft, a sleeve having a square socket fitted upon and rotatable with the driving shaft, a worm engaging said worm wheel mounted upon said sleeve and rotatable thereon, hubs on said worm, said worm and worm wheel adapted to be readily removed from their respective shafts and replaced by others of like size but different pitch to vary the speed of rotation of the seeding devices, a separable housing closely incasing such worm and worm wheel as may be used and provided with bearings for the hubs of said members, and a breakable pin connecting said worm to the sleeve and to the driving shaft.

In testimony whereof I affix my signature in presence of two witnesses.

PAUL L. HATFIELD.

Witnesses:
LUTHER E. ROBY,
W. V. TEFFT.